United States Patent Office 3,814,799
Patented June 4, 1974

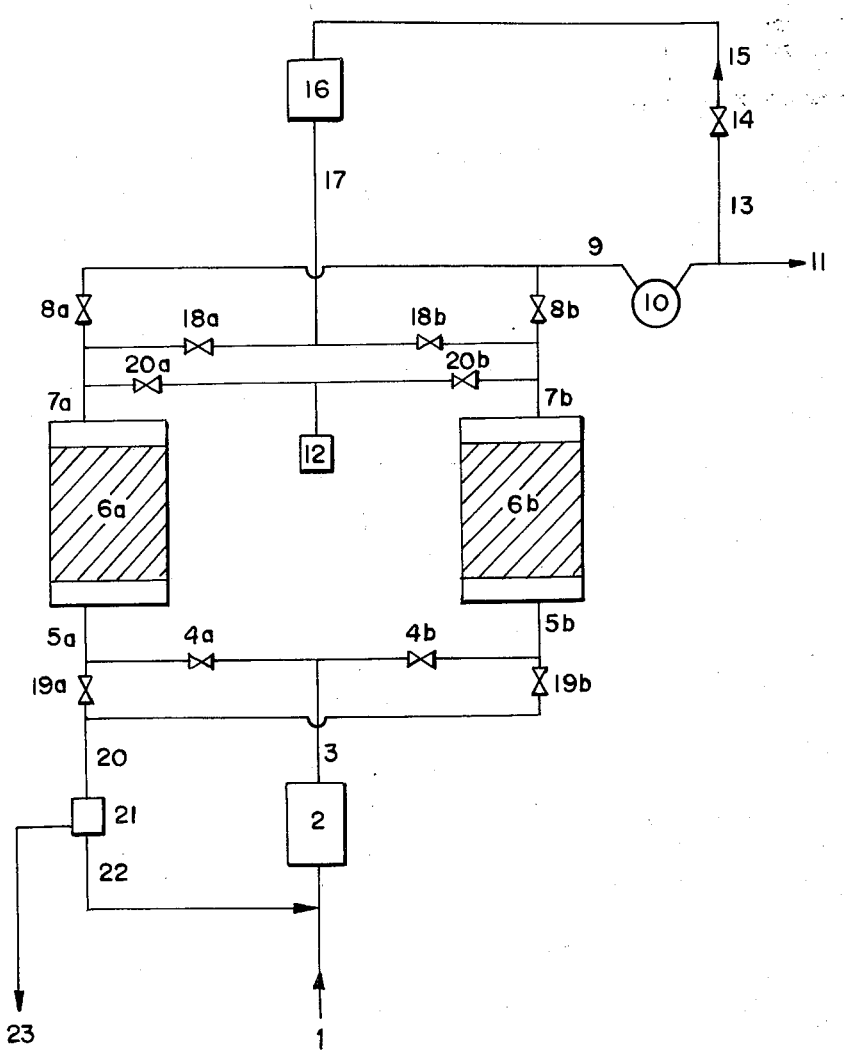

3,814,799
PURIFYING GASES CONTAINING MERCURY OR MERCURY AND OXYGEN AS IMPURITIES
Ewald Wygasch, Ludwigshafen, Germany, assignor to Badische Anilin- & Soda-Fabrik Aktiengesellschaft
Filed Jan. 14, 1972, Ser. No. 217,850
Int. Cl. B01d 53/34
U.S. Cl. 423—210     7 Claims

ABSTRACT OF THE DISCLOSURE

Impurities consisting of mercury and/or oxygen are removed from gases by means of an absorbent supported on a carrier.

The absorbent used is copper, and the carrier is aluminum oxide. The aluminum oxide has an internal surface area of from 100 to 300 m.$^2$/g., a pore volume of from 0.5 to 0.8 cm.$^3$/g. and an average pore diameter of from 40 to 80 A.

---

In the electrolysis of alkali metal chlorides, chlorine, alkali metal hydroxide and hydrogen are produced in equivalent amounts. In the amalgam process the hydrogen is generated in the decomposer in which the alkali metal amalgam formed in the primary cell is catalytically decomposed with water at temperatures ranging from about 60° to 120° C. into mercury, alkali metal hydroxide and hydrogen. The hydrogen leaving the decomposer is saturated with water vapor and mercury vapor to an extent depending on the temperature of the caustic solution used in the decomposer. The hot hydrogen is then usually directly or indirectly cooled. It was formerly the practice to cool the hydrogen coming from the different cells in a common cooler but in recent years the preference has been to cool the hydrogen immediately on leaving each decomposer so that the condensed mercury may be directly returned to the mercury cycle. At hydrogen temperatures of from +10° to +30° C., which may usually be achieved by cooling with water at a temperature of approx. +5° to +25° C., the mercury content is approximately 5–30 mg./m.$^3$.

Although the hydrogen produced in electrolytic cells is very pure (its purity is usually better than 99.9%), its high mercury content renders it useless for many applications, for example for the hydrogenation of fats for use in foodstuffs and for all hydrogenations in which the hydrogenation catalyst is poisoned by as little as a trace of mercury. Moreover, the high losses of mercury involved demand that it be removed and recovered as far as possible both for economical and hygienic reasons.

Various processes for the fine purification of hydrogen are known. One chemical purifying process involves washing with solutions containing active chlorine. However, this process necessitates subsequent thorough washing with water and caustic soda in order to remove entrained chlorine, chloride and mercury chloride. The residual content of mercury is about 20γ/m.$^3$. About the same degree of purity is achieved when the hydrogen is cooled to temperatures of from −40° to −50° C.

It is also known to remove mercury from gases by absorbing the mercury in variously impregnated activated charcoal. Such imregnation may be effected, for example with iodine or chlorine. Other known impregnation agents (German Published Application DAS 1,075,953) are alkali metal polysulfides, alkali metal sulfides and alkali metal hydrogen sulfides. According to U.S. Pat. 3,193,987, fine purification of gases is carried out using activated charcoal impregnated with a metal capable of forming an amalgam with mercury, for example copper or silver. The activated charcoal prepared in this manner, after it has become laden with mercury, can be regenerated either not at all or only with difficulty, its activity deminishing after each regeneration. Thus such charcoals have not yet been adopted in large-scale work in the fine purification of gases for the removal of their mercury content.

Finally, it is known to remove mercury from gases by contacting the latter with an absorbent consisting of silver metal deposited on silica. However, such an absorbent has the drawback that it quickly disintegrates to a powder an account of the moisture content of the gases and the high gas velocities used. To obviate this drawback, German Published Application DAS 1,244,721 proposes that aluminum oxide be used as support for the silver metal, which aluminum oxide is used in the fused form to render it sufficiently durable.

I have now found that impurities consisting of mercury and/or oxygen may be advantageously removed from gases by treatment with copper supported on a carrier, provided that the copper is supported on a carrier of aluminum oxide having an internal surface area of from 100 to 300 m.$^2$/g., a pore volume of from 0.5 to 0.8 cm.$^3$/g. and an average pore diameter of from 40 to 80 A.

In principle, the process of the invention may be used to purify all gases which do not react with mercury. However, it is applicable with particular advantage to the purification of hydrogen produced, for example, in the electrolysis of alkali metal chlorides by the amalgam process.

The absorbent is distiguished by high activity and a long life. It shows virtually no reduction of activity when used for periods as long as several years or when regenerated repeatedly. It is particularly advantageous that the absorbent used is capable of removing both mercury and oxygen.

The absorbents of the invention may be prepared in a simple manner, for example by impregnating the aluminum oxide with an aqueous solution of a copper salt followed by drying and, if necessary, calcining and then converting the copper to the metallic form before use. The copper content of the absorbent may be for example from 0.5 to 40% and preferably from 3 to 15% by weight.

The temperature at which the absorbents of the invention are contacted with the mercury-containing and/or oxygen-containing gases may be varied within wide limits. It is advantageous to use a temperature of from 0° to 120° C. Thus the purification may be easily carried out at room temperature (20° C.). If, however, the gases to be purified contain oxygen, it is advantageous to carry out purification at elevated temperature, i.e. temperatures above 70° C., for example temperatures of from 75° to 120° C. The reason for this is that at lower temperatures the pyrophoric absorbent tends to form copper oxides with the oxygen contained in the gas. Since copper oxide does not form an amalgam with mercury, the capacity of the absorbent to absorb mercury falls continuously as the highly active copper surface is converted to inactive copper oxide, in which case more frequent regeneration of the absorbent is necessary. If, however, absorption is carried out at temperatures above about 70° C., the oxygen is catalytically converted to water at these high temperatures under the influence of the highly active absorbent and no copper oxide is formed which could diminish the mercury-absorbing capacity of the absorbent. Accordingly, it is advantageous to carry out purification at temperatures of, say, from 0° to 50° C. when the oxygen content of the hydrogen is less than about 20 p.p.m., whilst temperatures above 70° C. are more suitable at higher oxygen contents.

Purification by the method of the invention may be effected at atmospheric pressure or at elevated or reduced pressures, as the absorptive capacity of the absorbent is not affected by pressure.

Thus the temperatures and pressures used during purification are governed by the particular operating conditions and by the conditions under which the purified hydrogen is to be used. It may in some cases be advantageous, before carrying out purification by the method of the invention, to cool the hydrogen directly or indirectly, for example with water or low-temperature brine, in order to reduce the mercury and moisture contents of the hydrogen and thus to increase the intervals between regenerations of the absorbent. If the hydrogen is to be used at elevated pressure, it is advantageous to compress the hydrogen (which is usually produced in the decomposer cells at atmospheric pressure) to the desired pressure and to precipitate a major portion of the mercury by cooling before the purification of the invention is carried out.

Regeneration of the absorbent is simply carried out at temperatures of from 180° to 400° C. and preferably from 200° to 220° C. by passing a stream of hydrogen through the absorbent.

The process of the invention is described below with reference to the accompanying drawing.

The hydrogen formed in the amalgam decomposer of a plant for the electrolysis of alkali metal chlorides is fed through line 1 to a cooler 2 in which the hydrogen is cooled to a temperature below 0° C. It then passes through line 3, the open valve 4a and line 5a to tower 6a packed with absorbent. The purified hydrogen then passes through line 7a, the open valve 8a, line 9, compressor 10 and line 11 to the consumer plant. This route is maintained until the analyzer 12 connected to line 7a via open valve 20a indicates a mercury content in the gas. The valves 4b, 8b and 20b are then opened and the valves 4a, 8a and 20a closed. The hydrogen is then purified in tower 6b while the absorbent in tower 6a is regenerated. To this end, a portion of the purified hydrogen, for example 10% by volume thereof, is withdrawn from line 11 and passed through line 13, open valve 14 and line 15 to the gas heater 16 in which the hydrogen is heated to, say, 300° C. The heated gas leaves the gas heater 16 through line 17 to pass through open valve 18a and line 7a to the absorption tower 6a. On leaving the tower, it passes through line 5a, open valve 19a and line 20 to cooler 21 where it is cooled to temperatures below 30° C. The condensed mercury is removed through line 23. The gas may then be returned to line 1 through line 22, for example. It will be appreciated that the said gas heater 16 may be omitted if, for example, the towers 6a and 6b are themselves provided with heaters. Alternatively, the towers may be heated in addition to the gas (heated in the gas heater), in order to accelerate regeneration. Regeneration is carried out, for example, by heating the gas until its temperature on leaving the absorption tower is 200° C. Gas is then passed through the tower until its temperature has dropped to, say, 80° C. At this point, the valves 14 and 18a are closed.

When the absorbent in tower 6b is exhausted, the gas flow is switched over to tower 6a and the absorbent in tower 6b is regenerated in a similar manner.

In a plant operated on the above lines, the absorption towers are packed with absorbent consisting of 5 x 5 mm. aluminum oxide pellets supporting 13.5% by weight of copper. The aluminum oxide has an internal surface area of 130 m.$^2$/g., a total pore volme of 0.6 cm.$^3$/g. and an average pore diameter of 70 A. At a pressure of from 200 to 300 mm. of water, 7,000 m.$^3$ of hydrogen are passed through the plant per hour, the hydrogen having been precooled by direct brine cooling from an initial temperature of from 10° to 30° C. to a final temperature of −10° C. and then allowed to return to room temperature. The thus partially purified hydrogen contains 0.8 mg. of Hg./m.$^3$ and from 12 to 20 p.p.m. of O$_2$. The purified hydrogen contains 1γ of Hg./m.$^3$ and from 1 to 3 p.p.m. of O$_2$. The absorbent shows no reduction of activity after an uninterrupted period of use of 6.5 years and 62 regeneration.

EXAMPLE 1

Hydrogen containing from 0.8 to 1 mg. of Hg/m.$^3$ and from 10 to 12 p.p.m. of O$_2$ is passed up through a glass tube having a diameter of 40 mm. and a height of 2 m. and packed to a height of 1.5 m. with an absorbent, at room temperature at a rate of 1 m.$^3$/hr. The absorbent consists of 4 x 4 mm. pellets of aluminum oxide having an internal surface area of 220 m.$^2$/g., a total pore volume of 0.7 cm.$^3$/g. and an average pore diameter of 65 A. and having a copper content of 2% by weight. A recording UV absorption analyzer, which possesses a sensitivity of 1γ of Hg/m.$^3$, gives initially no response when measuring the mercury content of the hydrogen leaving the tube. After 670 hours, the analyzer slowly indicates the presence of Hg and its trace rises from zero to 25γ of Hg/m.$^3$. The hydrogen feed is then stopped, and the absorbent is regenerated by passing 0.1 m.$^3$ of hydrogen/hr down through the tube for 5 hours at a temperature of 350° C. After using and regenerating the absorbent three times, its absorptive capacity is unchanged.

EXAMPLE 2

Hydrogen containing 0.8 to 1 mg. of Hg/m.$^3$ and from 10 to 12 p.p.m. of O$_2$ is passed, at room temperature and at a rate of 1 m.$^3$/hr., through a glass tube of the type described in Example 1 but containing absorbent consisting of 5 x 5 mm. pellets of aluminum oxide activated with 13.2% by weight of copper. The aluminum oxide has a surface area of 150 m.$^2$/g., a total pore volume of 0.7 cm.$^3$/g. and an average pore diameter of 70 A. After 1,080 hours, the analyzer begins to show the presence of Hg. The absorptive capacity of the absorbent is unchanged after it has been regenerated 7 times with hydrogen at 250° C.

EXAMPLE 3

Hydrogen containing mercury in a concentration of 15 mg./m.$^3$ and oxygen in a concentration of from 15 to 18 p.p.m. is passed, at room temperature and at a rate of 1 m.$^3$/hr., through a packed glass tube as described in Example 2. The analyzer begins to indicate the presence of Hg after 184 hours.

EXAMPLE 4

Hydrogen containing from 0.8 to 1 mg. of Hg/m.$^3$ and from 10 to 20 p.p.m. of oxygen is passed through a packed glass tube as described in Example 3 at a rate of 2 m.$^3$/hr. and at temperature of 80° C. The analyzer begins to indicate the presence of Hg after 2,880 hours.

EXAMPLE 5

Hydrogen containing from 0.5 to 1 mg. of Hg./m.$^3$ and 0.1% by volume of O$_2$ provided by adding 1 l. of oxygen per hour, is passed, at a temperature of from 80° to 85° C. and at a rate of 1 m.$^3$/hr., through a packed glass tube as described in Example 2. The analyzer begins to indicate the presence of Hg after 6, 150 hours. The oxygen content o fthe hydrogen after passing through the tube is from about 2 to 3 p.p.m.

I claim:
1. A process for the removal of mercury from gases which do not react with mercury by treating said gases with copper supported on a carrier, wherein the copper is supported on a carrier of aluminum oxide having an internal surface area of from 100 to 300 m.$^2$/g., a pore volume of from 0.5 to 0.8 cm.$^3$/g. and an average pore diameter of from 40 to 80 A.

2. A process as set forth in claim 1, wherein the copper content of the absorbent is from 0.5 to 40% by weight.

3. A process as set forth in claim 1, wherein the treatment is carried out at a temperature of from 0° to 120° C.

4. A process as set forth in claim 1 wherein said gases include hydrogen and oxygen, the amount of oxygen being less than 20 p.p.m. and wherein said treatment is carried out at a temperature of from 0° to 50° C.

5. A process as set forth in claim 1 wherein said gases include hydrogen and oxygen, the amount of oxygen being more than 20 p.p.m. and wherein said treatment is carried out at a temperature of from 70° to 120° C.

6. A process as set forth in claim 4 wherein said gases are formed in the electrolysis of alkali metal chloride.

7. A process as set forth in claim 5 wherein said gases are formed in the electrolysis of alkali metal chloride.

References Cited

UNITED STATES PATENTS 3,682,585  8/1972  Frevel et al. _____ 423—210

EARL C. THOMAS, Primary Examiner

U.S. Cl. X.R.

423—219, 644

UNITED STATES PATENT OFFICE
CERTIFICATE OF CORRECTION

Patent No. 3,814,799                Dated June 4, 1974

Inventor(s) Ewald Wygasch

It is certified that error appears in the above-identified patent and that said Letters Patent are hereby corrected as shown below:

Column 1, line 7, insert
-- 30        Foreign Application Priority Data
        January 16, 1971   Germany . . . P 21 02 039.3 --.

Column 1, line 63, "imregnation" should read -- impregnation --.

Column 2, line 28, "distiguished" should read -- distinguished --.

Column 4, line 60, "o fthe" should read -- of the --.

Signed and sealed this 22nd day of October 1974.

(SEAL)
Attest:

McCOY M. GIBSON JR.                C. MARSHALL DANN
Attesting Officer                   Commissioner of Patents